United States Patent

[11] 3,560,739

| [72] | Inventor | Otto Wolff<br>Alt-Pichelsdorf 11, 1000 Berlin 20, Germany |
|---|---|---|
| [21] | Appl. No. | 810,698 |
| [22] | Filed | Mar. 26, 1969 |
| [45] | Patented | Feb. 2, 1971 |
| [32] | Priority | Mar. 26, 1968 |
| [33] |  | Switzerland |
| [31] |  | 4451/68 |

[54] PARTICLE BEAM APPARATUS FOR SELECTIVELY FORMING AN IMAGE OF A SPECIMEN OR ITS DIFFRACTION DIAGRAM
24 Claims, 4 Drawing Figs.

[52] U.S. Cl. ................................................. 250/49.5;
313/84; 335/210
[51] Int. Cl. .................................................. G01n 23/04;
H01j37/14; H01i37/26
[50] Field of Search ......................................... 250/49.5(1),
49.5(4); 313/84; 335/210

[56] References Cited
UNITED STATES PATENTS
| 2,418,349 | 4/1947 | Hillier et al. ................... | 250/49.5 |
| 3,046,397 | 7/1962 | Delong et al. ................... | 250/49.5 |

*Primary Examiner*—William F. Lindquist
*Attorney*—Curt M. Avery, Arthur E. Wilfond, Herbert L. Lerner and Daniel J. Tick ABSTRACT: Particle beam device for selectively imaging a specimen or a specimen diffraction diagram having a separately energizable electromagnetic diffraction lens located coaxially of the beam axis between the lens gap of objective lens and the projection lens. The diffraction lens is mounted in magnetically insulating relation within the bore of the objective lens which reduces the axial space of the device. The diffraction lens comprises two component lenses that develop opposing magnetic fluxes along the beam axis so that image rotations within the diffraction lens are avoided.

PARTICLE BEAM APPARATUS FOR SELECTIVELY FORMING AN IMAGE OF A SPECIMEN OR ITS DIFFRACTION DIAGRAM

My invention relates to a particle beam apparatus for selectively forming an image of a specimen or its diffraction diagram. A solution to this task is known from a paper in "Philips' Technische Rundschau," Aug. 1950, pages 33 to 64, which discloses an electron microscope that contains a radiation part in beam direction in front of the specimen, as well as an imaging part in beam direction behind the specimen which has an individually energizable electromagnetic diffraction lens located between the lens gap of an electromagnetic objective lens having a lens bore and an electromagnetic projection lens of such construction that it translates the diffraction diagram outlined in the back focal plane of the objective lens into the objective plane of the projection lens.

In known particle beam apparatus the projection lens constitutes the projective lens of an electron microscope, that is, the last image-forming lens in beam direction, and the diffraction lens, or the intermediate lens arranged between the diffraction lens and the projective lens, is selectively energized. In the first-mentioned operational state, the diffraction diagram is enlarged and projected on a final image screen, whereas the normal electron-microscopic image of the specimen is formed during operation with an energized intermediate lens.

Due to the use of electromagnetic lenses in the known electron microscope as well as due to the frequent energization and deenergization of the intermediate lens and of the diffraction lens which must have variable refraction forces, additional image distortions can occur during transitions between the conventional operating condition wherein an image of the specimen is formed and the condition wherein an image of the diffraction diagram is formed. These distortions make the coordination or correspondence of the image of the diffraction diagram to the image of the specimen more difficult. Also, the diffraction lens, arranged as an independent lens between the image lenses, utilizes space in axial direction and it is desirable to construct the customarily perpendicularly arranged electron microscope so as to have the smallest possible height.

The publication of the Sixth International Congress for Electron-Microscopy in Kyoto, 1966, pages 19 and 20, discloses the use of an electrostatic diffraction lens to prevent a disturbing change of the stray fluxes in the vicinity of the specimen which causes detrimental influences to the electron beam impinging upon the specimen during high-resolution investigations. The electrostatic lens is within an electron microscope equipped with electromagnetic lenses. In this connection, actually two electrostatic lenses are used, one being a reducing lens and the other a magnifying lens. The lenses are selectively energized. After the reducing lens is energized and while the intermediate lens behind the two diffraction lenses is switched on (three-step specimen imaging), or when the intermediate lens is switched off (two-step specimen imaging) and the magnifying diffraction lens is energized, a two-step magnified image of the diffraction diagram is obtained with useful camera length.

Because the diffraction lenses are constructed as electrostatic lenses in the aforedescribed device, their energization does not produce an additional image rotation. However, the lenses require a supplementary high voltage generator in addition to the space needed for independent lenses because of the dielectric strength between the electrodes and other high-voltage-carrying parts. The high-voltage generator must generate a very constant voltage.

It is an object of my invention to provide a particle beam device for selectively forming an image of a specimen or its diffraction diagram. Subsidiary to this object, it is an object of my invention to equip the radiating and imaging portions of the particle beam device with permanent magnet lenses. It is still another object of my invention to provide a particle beam apparatus which eliminates the aforementioned disadvantages of the known apparatus.

With regard to providing the radiating and imaging portions with permanent magnet lenses, none is provided in the electromagnetic diffraction lens. Typical of the particle beam devices to which the present invention relates are electron and ion microscopes.

According to a feature of the invention, the diffraction lens is constructed as a double lens with two lens gaps having a mutual separation smaller than the image width of the component lens of the diffraction lens which contains the first lens gap in beam direction. The magnetic fluxes of the diffraction lens are oppositely aligned along the lens axis and are in a relation to each other with respect to intensity so as to eliminate the disturbing image rotation through the diffraction lens. Also, the diffraction lens is positioned in magnetic insulating relation within the bore of the objective lens.

Thus, the invention combines the advantages of an electrostatic diffraction lens (that is, good shielding, no image rotation) with the advantages of an electromagnetic diffraction lens (no additional high-voltage generator, easy adjustment of the lens excitation) as well as a reduction in the additional axial space, required in the known embodiment for both lenses. These advantages are combined because the construction selected for the lens is such that the latter is free of image rotations and because the diffraction lens is accommodated within the objective lens.

The construction of electromagnetic double lenses has been known in several basic forms for a long time. For example, German Pat. No. 819,438 discloses a double lens system wherein a single winding for the production of the magnetic flux and a single iron core with two lens gaps following each other in beam direction are provided. This type of lens arrangement attains the same focal length as a single lens but with a considerably smaller cross section in the flux-carrying iron path. Such a double lens system, however, is not used in the invention since in the known double lens system the magnetic fluxes are equally aligned so that the image rotation, which the invention purposely aims to avoid, occurs as before.

Another basic construction of double lenses is shown in U.S. Pat. No. 2,418,349. Here, two lenses having individual windings and iron cores and having two lens gaps are arranged sequentially one behind the other so that the second of the two lenses seen in beam direction is arranged within the focal length of the first lens seen in beam direction. The significance of this arrangement is found in the reduction of lens errors.

Still another configuration is described in German Pat. No. 680,284. There two lens windings are present which are subordinated to one lens gap. With the aid of variable lens currents passed through the two windings, the location of the position of the lens axis can be adjusted in radial direction where the greatest influence of the beam takes place. If the number of ampere windings of the upper coil is greater, this position will be above the center point of the entire lens, otherwise this position will be below the center point. Hence, the effect of the influence of the beam can be placed at an arbitrary point between the two lens gaps, within certain limits. Here, too, the magnetic fluxes are aligned equally in both lens gaps.

In contrast, a report in the "Zeitschrift fur physik" 1935, pages 634 to 642, describes an electromagnetic double lens which is constructed so that the image rotations caused by each of the lens components of the device are canceled out because of the oppositely directed fluxes in both lens gaps. This type of lens arrangement is used to particular advantage as a diffraction lens because the double lens is arranged within the objective lens. It is essential for the double lens according to the invention that no intermediate image occur between the two lens gaps; otherwise this arrangement would constitute a normal sequence of two separate lenses.

The effect of such a double lens, as utilized by the invention, results because the refracting power of the lens is proportional to the square of the magnetic field intensity and thus is not dependent on the direction of the magnetic flux in the two lens gaps, while the image rotation is linearly proportional to the field intensity and thus dependent on the direction of the magnetic fluxes.

The advantage of using an additional diffraction lens provides a considerable operational simplification of the device during the transition of conventional specimen imaging, to an imaging of the diffraction diagram or vice versa.

Normally, this transition is effected by reversing the excitation of the intermediate lens in such a manner that, alternately, the image of the specimen or the image of the diffraction diagram is projected on the final image screen of the apparatus or on the photographic material. This not only produces a change in the image rotation brought about by the intermediate lens, as a result of a change in its excitation current, but can also produce, particularly when the construction of the particle beam apparatus is crowded, the aforementioned change in the stray fluxes within the region of the specimen, which necessitates a subsequent adjustment in the radiation portion.

If on the other hand, an additional diffraction lens is installed, the excitation of the intermediate lens remains constant and no image rotation occurs in the diffraction lens as designed by the invention.

According to a feature of the invention, the diffraction lens is constructed so that it transmits the diffraction diagram into the object plane of an immediately adjacent projection lens, that is, an intermediate lens in a particle beam apparatus which contains more than two image lenses. It is also possible to dimension the diffraction lens, or more specifically, to vary its excitation current so that the diffraction lens also effects a transmission into the object plane of another projection lens, namely, in a three-stage particle beam apparatus, into the object plane of the projective lens.

According to another feature of the invention, it many be of advantage to vary the excitation current of the diffraction lens in such a way that when the excitation current of the objective lens is switched off, the diffraction lens can be adjusted for forming an image of the specimen in the object plane of the projection lens. This type of operation affords the opportunity of employing the diffraction lens virtually as an objective with a long focal length which images the specimen which lies in its customary position with slight magnification or with an imaging scale of 1:1 in the object plane of, for example, the intermediate lens. This affords a possibility for small enlargements, for example, with an electron microscope at sufficient resolving power.

As a rule, the use of the diffraction lens, provided in accordance with the invention, does not require additional regulating devices, since the distance between the specimen plane and the rear focal plane of the objective lens is very small in all cases and since the lens circuit of the diffraction lens must, in any case, contain means for making a precision adjustment of the diffracting power of this lens.

As already discussed, the diffraction lens can be used as a true transmission lens, that is, at an image scale of 1:1, but it is also possible to adjust an imaging scale, deviating therefrom. As a rule, one will prefer, as a result of an appropriate selection of such an imaging scale, to provide approximately the same magnification for the imaging of the first specimen image projected by the objective as for the imaging of its diffraction diagram. On the other hand, it may be expedient in connection with certain specimen structures to magnify the diffraction diagram more than the image of the specimen. However, available space conditions frequently limit the selection of the imaging scale to a value which is close to the imaging scale of 1:1.

This imaging scale of 1:1 will be adjusted, for example, when the diffraction diagram is transmitted into the object plane of the adjacent projection lens and if the same magnification is desired as that during the imaging of the first specimen image.

A projection lens is dependent with respect to its focal length on the value of magnetic field intensity; this dependency is defined by a characteristic curve for which the focal width first decreases to a minimum with increasing magnetic field intensity and thereafter increases in response to further increases in magnetic field intensity. In contrast to the projection lens, the focal width of a transmission lens, for example of the objective lens, diminishes with an increase in magnetic field intensity in one direction. In the meaning of this definition is described the conception of a projection lens within the scope of the invention.

In the preferred embodiment of the invention, the diffraction lens has two flux-producing windings, as well as an iron path consisting of three annular discs positioned on the front faces of the windings and a tubular portion which connects the outer faces of the discs so as to enclose the two windings. The inner regions of the annular disc which face the lens axis define as pairs, the two lens gaps. Thus, the double lens has neither an inner iron core nor special pole shoes for defining the lens gaps; rather, the latter are formed by the discs as gaps with lengths which virtually correspond to the height of the winding lying parallel therewith. This not only affords the advantage of small distortions but limits the resulting magnetic flux so that the iron cross sections can be small. This type of core-free design is recommended for the diffraction lens also in view of its installation into the objective lens which makes space conditions very limited. With this design of the diffraction lens, the induction in the iron path can be so small that highly permeable iron alloys can be used having very small coercive force and so, also a low remanence. This ensures that, after the excitation current for the diffraction lens is shut off, the latter can no longer influence the particle beam.

In the preferred embodiment, the objective lens is designed as a pole shoe lens and the bore of its second pole shoe in beam direction is widened in its region that faces away from the lens gap, thereby forming a receptacle for the diffraction lens. In this arrangement, if an electromagnetic objective lens is used, its winding surrounds the diffraction lens, so that in axial direction there is no lack of space, at least not a disturbing lack of space, for the diffraction lens.

This spatial concentration of beam-influencing devices can be further extended by simultaneously providing an expansion in the second objective pole shoe for receiving a stigmator arranged in beam direction ahead of the diffraction lens. Such stigmator devices are known, for example, from U.S. Pat. No. 3,150,258.

A construction for the objective lens known from U.S. Pats. Nos. 2,851,611 and 2,939,955 can also be advantageous within the scope of the invention, whereby the objective lens has two excitation windings, following each other in sequence in radiation direction. Between these two excitation windings, to the side of the lens gap, a space is left open for a device used for laterally inserting the specimen into the lens gap. With this type of lateral specimen insertion, no space must be provided above the objective lens for a locking device and neither does a specimen cartridge extend into the bore of the upper pole shoe of the objective lens. The bore of the first pole shoes, seen in beam direction, of the objective lens can then be provided with a deflection system for the particle beam so that diffraction diagrams can also be produced in the light of individual reflections. Such deflection systems are also part of the state of the art and can be formed of coil pairs lying opposite each other or of electrostatic deflection plates, so that through an appropriate excitation of the two pairs, the particle beam can be deflected in any desired direction prior to its impingement upon the specimen. The two pairs of deflector devices can also be combined by arranging the front faces of the coils of one pair, facing the beam, simultaneously, as electrostatic deflection plates, insulated and connected to voltage, so that they constitute the second pair at the same time. In this connection, reference is made to German printed publication DAS 1,088,628, 21g 37/01.

For structural reasons the first winding, in beam direction, of the objective lens is constructed for a larger number of ampere turns than the second excitation coil. For example, the first coil can receive two-thirds of the total number of ampere turns.

The arrangement of the diffraction lens, with its magnetically conductive parts within the objective lens, affords good shielding of the specimen vicinity against stray fields which can be produced by the diffraction lens. In this respect, too, the core-free design of the diffraction lens with low field intensity is preferred.

Investigations have shown that though the diffraction lens has a relatively large opening error constant, due to its construction, the disturbance caused by the opening error can become virtually negligible down to low magnifications.

It is known that a selector diaphragm will usually be arranged in the object plane of that projection lens into which the diffraction lens transmits the diffraction diagram. This is done for the purpose of masking details in the image. In this case, the objective lens is firmly adjusted to the selector diaphragm plane and likewise the below lying projection lens which usually constitutes an intermediate lens in the apparatus. The total magnification of the particle beam apparatus must, therefore, be adjusted by changing the excitation of the intermediate lens and the refractory force of the projection lens. Since the object plane, as well as the image plane, are fixedly assumed, it may be necessary, according to a further feature of the invention, to provide two intermediate lenses, the first in beam direction, constituting the projection lens into whose object plane the diffraction lens transmits the diffraction diagram.

The excitation currents of the two intermediate lenses must then be variable for the objective lens, in accordance with the desired total magnifying range, at a constant excitation current. Conventional current adjusters are used for this purpose. Also, as shown in German Pat. No. 929,747, several exchangeable pole shoe systems can be provided for the objective lens and held, for example, in a rotary drum type device.

As previously mentioned, the magnifying adjustment is effected by changing the excitation of the intermediate lenses. Even if a disturbing image rotation due to the diffraction lens is eliminated by an appropriate construction of this lens, it is still advantageous to construct the intermediate lenses also in form of double lenses which are free of image rotation.

In this way a particle beam device is obtained which makes it possible to produce with the same orientation magnified images of a diffraction diagram as well as of a specimen, regardless of the respective magnification.

If a fixed adjustment for the diffraction forces of the specimen and the projective is used, care must be taken during the construction of the intermediate lens so that it will accommodate an imaging particle beam having a large diameter, during small magnification, this being especially true for the second intermediate lens seen in beam direction. The bore of the first intermediate lens must also have a large diameter in view of the image errors, since this lens must scale down during a low magnification and must produce an image close to the second intermediate lens during high magnification. As conventional lens equations show, the dimensioning also includes, essentially, the distance between the selector diaphragm plane and the principal plane of the first intermediate lens.

By leaving an appropriate space between the two intermediate lenses, an additional device for universal diffraction can be inserted therebetween which primarily contains a specimen holder and a subsequently energized lens. These devices are known as such; for example, see U.S. Pat No. 2,403,529. There is also space for a device for X-ray microanalysis.

The preferred structural configuration of the invention specifies that the diffraction lens be held at a base plate while it extends into the bore of the objective lens. The base plate with inserted vacuum seals rests against the rear front face, in beam direction, of the objective lens and has channels for accommodating electrical terminal leads in a vacuumtight manner. Channels for cooling means can also be provided. This base plate can be provided with an adjusting drive for transverse displacement for centering the diffraction lens with respect to the axis of the objective lens. In principle, a construction such as the one known, for example, from U.S. Pat. No. 2,939,955, for transversely displacing specimen tables can be used to achieve this purpose. The vacuumtight arrangement of such drives is known, for example, from U.S. Pat. No. 2,423,158.

As previously mentioned, it is necessary to install the diffraction lens in the objective lens in a magnetically insulated relation thereto, so that the respective fluxes of these lenses will be separate from each other. Since the diffraction lens is located within the vacuum chamber of the apparatus, this insulation can be accomplished by arranging the diffraction lens in the bore of the objective lens under the formation of a gap.

The base plate described above can also serve as a holder for a stigmator device. In the latter case, it is preferable to equip the plate of nonmagnetic material with a tube which extends into the objective lens. The diffraction lens as well as the stigmator device are then arranged on this tube.

A disc which shields stray magnetic fields can be arranged in beam direction following the base plate, the disc being equipped with means for receiving the selector diaphragm and accompanying drives, and following the latter, the projection lens is positioned, whereby the disc is inserted between the aforementioned equipment by the interpositioning of vacuum seals.

The invention will be further elucidated with reference to embodiments illustrated by way of example on the accompanying drawings in which.

Figure 1:
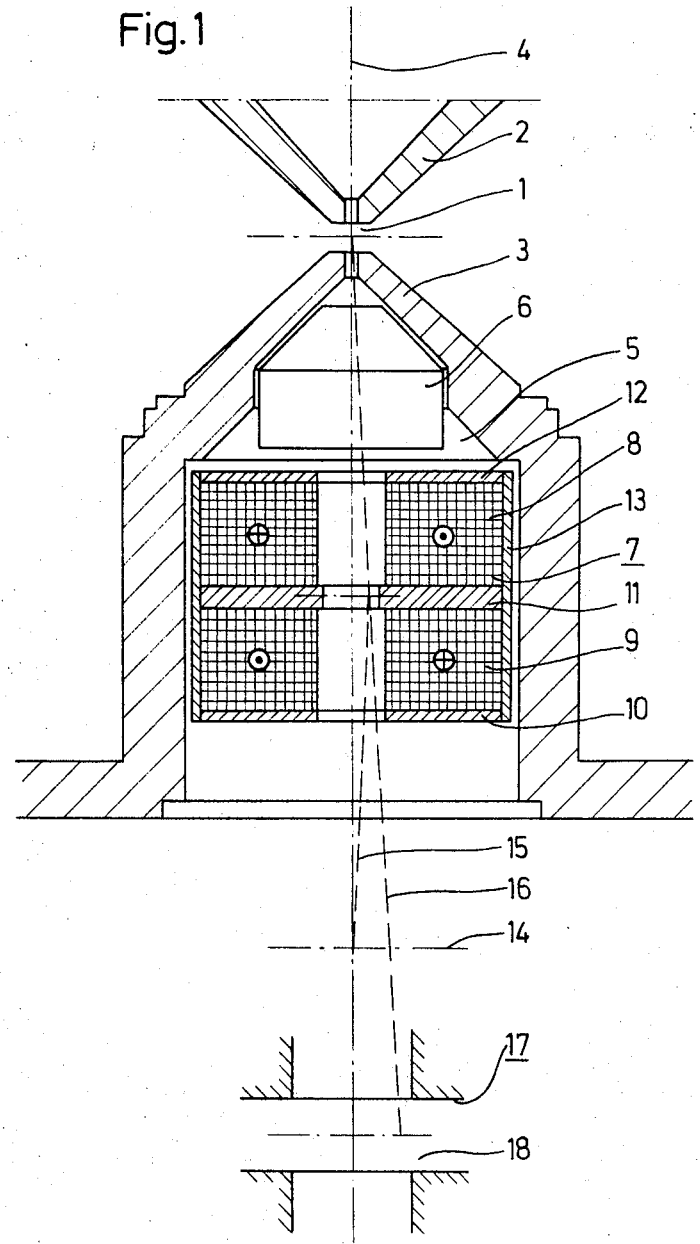
FIG. 1 is a schematic illustration, in section, of an objective lens of an electron microscope equipped with a diffraction lens constructed as a double lens.

The lens gap 1 of the objective lens in FIG. 1 is formed by the two pole shoes 2 and 3 which have bores for passing the electron beam, the axis of the latter being indicated by reference numeral 4. The bore 5 of the second pole shoe 3, in beam direction, is constructed to receive the stigmator device 6 and the diffraction lens 7. The diffraction lens contains two excitation coils 8 and 9, as well as an iron path for the magnetic flux which is formed by the three discs 10, 11 and 12 at the front faces of the coils 8 and 9 together with tube 13 which connects the outer surfaces of the three discs in magnetic conductivity. The lens gaps of the diffraction lens 7 extend between the discs 12 and 11 and between 11 and 10 since no magnetic core has been provided. Due to mutually opposing currents in coils 8 and 9, the magnetic fluxes in these gaps are also opposed to each other. The current directions are indicated in FIG. 1 by a cross and a dot within respective circles. Consequently, the diffraction lens 7 functions free of image rotation with the same number of ampere turns for their windings 8 and 9 and is free of image rotation.

When the diffraction lens 7 is energized, it focuses the electron beam upon the selector diaphragm plane 14. The path of the beam is indicated by reference numeral 15 when the diffraction lens is energized and by 16 when the diffraction lens is deenergized.

The selector diaphragm plane 14 is coincident with the objective plane of the first intermediate lens 17 having lens gap 18.

Figure 2:
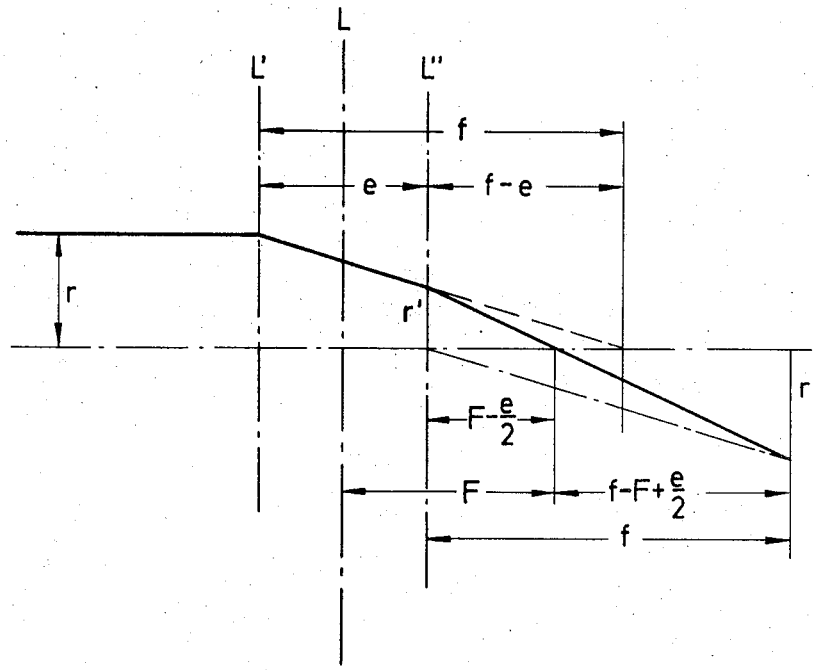
FIG. 2 is a schematic diagram showing the essential quantities needed in calculations pertaining to the defraction lens.
Figures 3, 4:
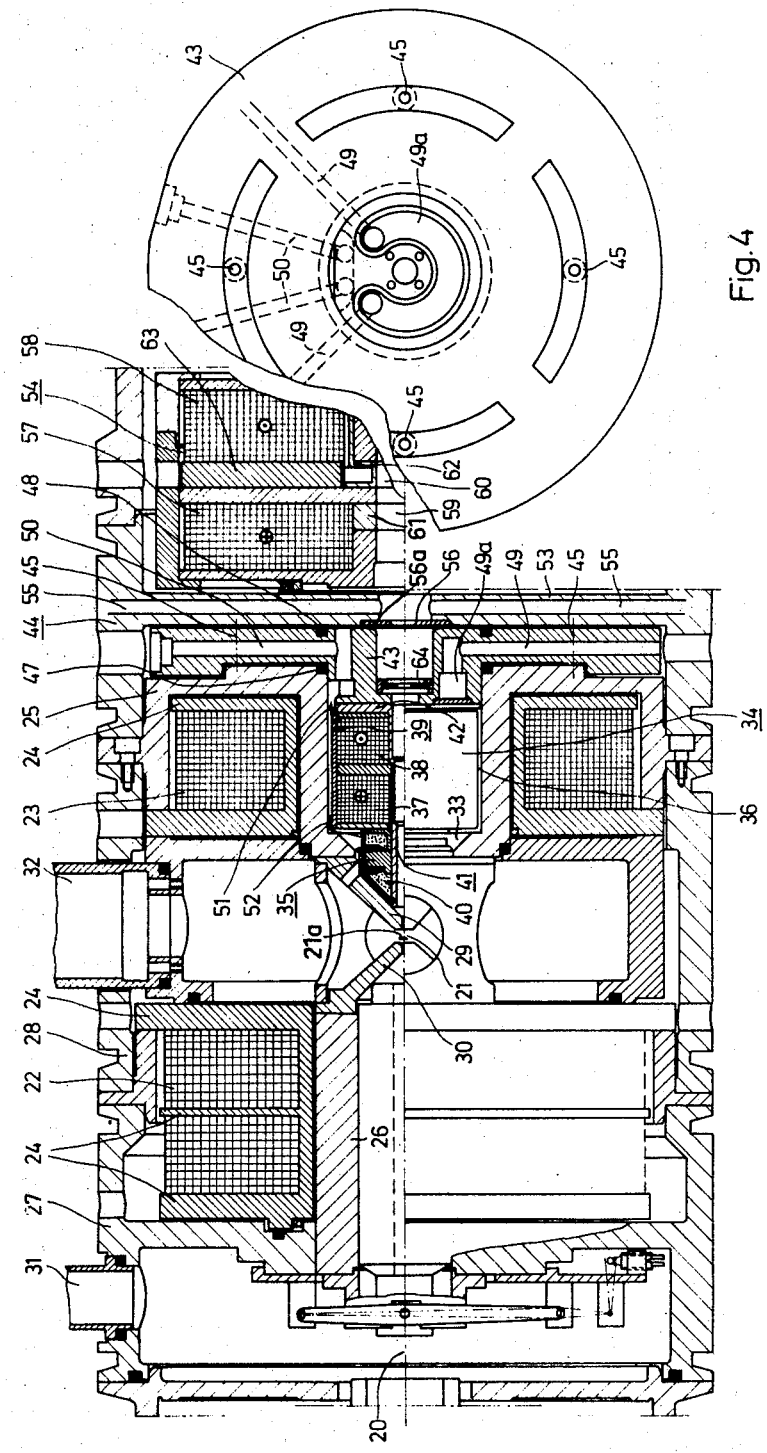
FIGS. 3 and 4 show, partly in section, the essential parts of an electron microscope pertaining to the illustrative embodiment of the invention.

Preparatory to a discussion of the embodiment of the invention according to FIGS. 3 and 4, the determination of the relation between the focal length $f$ of the first and second lens portions of the double lens which constitutes the diffraction lens, on the one hand, and of the resultant focal length $F$, on the other hand, is clarified by referring to FIG. 2. The same observations could be made for calculations pertaining to the intermediate lenses constructed as double lenses. Reference character L in FIG. 2 designates the primary plane of the double lens.

Assuming that the distance $e$ between the middle planes $L'$ and $L''$ of the two component lenses is considerably less than the focal width $f$ of the lens portions and assuming further, which is the case in actual practice, that the deviation between the positions of the main planes and the lens centers is negligible, the following equation is obtained:

$$\frac{F}{f} = \frac{1 - \frac{1}{2}\left(\frac{e}{f}\right)^2}{2 - \frac{e}{f}} \quad (1)$$

As a rule, the quadratic expression in the numerator will have a value in the vicinity of 0.1, so that the equation which is used in light optics can also be used to determine the approximate focal length of a double lens, as follows:

$$\frac{F}{f} \approx \frac{1}{2 - \frac{e}{f}} \quad (2)$$

FIG. 3 shows the region of an objective lens and of the first intermediate lens of an electron microscope. In the illustration, the electron beam emitted by a beam generator of known construction travels from left to right along axis 20. The beam crosses a specimen 21a arranged in gap 21 of the objective lens. By means of the objective lens and the succeeding magnifying lenses, and depending upon which plane is imaged by the subsequent lenses, the beam forms an image of the specimen or of the diffraction diagram which is magnified and projected on a nonillustrated screen or on photographic material.

The objective lens contains two windings 22 and 23 which are arranged at respective sides of the lens gap 21. In this example, a water cooling means 24 is provided for both lens windings, but its construction is of subordinate importance with regard to the invention. The magnetic flux produced by these windings closes through the iron path comprising parts 25 to 28 and the two pole shoes 29 and 30. The water cooling means 24 has no magnetic effect since it is made of copper. Reference numerals 31 and 32 designate connectors for vacuum lines.

According to the invention, the bore 33 of the second pole shoe 29, seen in beam direction, widens to form a receptacle for the diffraction lens 34 and the electromagnetic stigmator 35. The tubular inner region of portion 25 and the pole shoe tip 29 may be regarded as one portion. The bore diameter and the outer diameter of the diffraction lens 34 are dimensioned so that a magnetically insulated gap 36 exists between the two portions. As in FIG. 1, the diffraction lens 34 contains two excitation coils 37 and 38 through which current is passed in respectively opposite directions. Lens 34 also contains iron path 39 which has the same configuration as in FIG. 1. The coils of the stigmator 35 and the diffraction lens 34 are insulated by means of a casting resin 40.

The stigmator 35 and the diffraction lens 34 are positioned upon the tubular carrier 41 having a flange-type region 42 attached to base plate 43 made of magnetically neutral material. In beam direction behind the objective lens, the plate 43 extends transverse to the beam to reach to the region of the microscope housing 44. In this embodiment, the base plate is attached by screws 45 to part 25. Suitably arranged sealing means 47 and 48 ensure that the vacuum chamber of the apparatus will be as small as possible.

Channels 49 are arranged within the base plate 43 for the passage of a coolant. Additional channels 50 serve for leading electric leads to windings 37 and 38 as well as to the coils of the stigmator 35. For clarity, these leads are represented as 51 and 52 and are directed through the magnetically insulated intermediate space 36.

In the illustrated embodiment, the cooling channels 49 open into the cooling chamber 49a shown in FIG. 4, the latter also showing the arrangement of the channels 49. FIG. 4 shows the base plate 43 which can be made, for example, of brass or bronze.

A flux barrier 53 is disposed in beam direction behind the base plate 43. Barrier 53 functions to ensure that the stray fluxes of the diffraction lens 34 and of the succeeding intermediate lens 54 will not expand freely, the latter lens 54 also being constructed as a double lens. Carrier 53 is also constructed in the form of a plate. However, it is comprised of magnetically conductive material and is provided with channels 55 and the cage 56 for receiving a selector diaphragm of known design. The selector diaphragm is equipped with known drives for transverse displacement.

A feature of special significance with regard to the intermediate lens 54 is that it contains two excitation coils 57 and 58 provided with a lens gap 59 or 60. This gap is produced through interruptions in the iron or magnetic circuit by annular portions 61 to 62 of nonmagnetic material. Reference numeral 63 designates a water cooling means.

The aperture diaphragm 64 is located in the rear focal plane of the diffraction lens. The diaphragm is dimensioned so that the beam will pass without hindrance when the objective lens is deenergized, the beam having a relatively large cross section at the plane of the diaphragm.

The objective lens is always focused upon the plane of the selector diaphragm, that is, upon the plane of the cage 56. Immediately upon being energized, the diffraction lens 34 transmits the diffraction diagram, which is projected in the rear focal plane of the objective lens, into the plane of the selector diaphragm, so that a magnified image of the diagram is formed.

As previously noted, when the objective lens is deenergized, the diffraction lens 34 can also be used as an objective lens with a large focal length for imaging the specimen with a lower magnification.

Basically, with the exception of the diffraction lens, it is also possible to build the lenses as permanent-magnet lenses. This, however, may involve difficulties with respect to changes in the refraction forces.

The diffraction lens according to the invention does not require an undesirable increase of the diameter of part 25. In the embodiment of FIG. 3, it was preferable to supply the first winding 22, in beam direction, of the objective lens with the larger number of ampere turns.

It will be obvious to those skilled in the art, upon studying this disclosure, that my invention is amenable to various modifications with respect to details and can be given embodiments other than that particularly illustrated and described herein, without departing from the essential features of my invention and within the scope of the claims annexed hereto.

I claim:

1. In a particle beam device having a longitudinal optical axis, an apparatus for selectively imaging a specimen or a specimen diffraction diagram, said apparatus comprising beam generating means for issuing particle beams, means for accommodating a specimen in the path of said beams, an objective lens having a lens gap and a lens bore coaxial with said axis and having front and rear focal planes, said rear focal plane being spaced from said beam generating means a larger distance than said front focal plane, said diffraction diagram being imaged in said rear focal plane of said objective lens by the latter, a projection lens having an object plane and being disposed beyond said objective lens coaxially with said axis, and imaging means disposed beyond the specimen locality in coaxial relation to said axis, said imaging means having a separately energizable electromagnetic diffraction lens for transmitting the diffraction diagram imaged in said rear focal plane of the objective lens to said object plane of the projection lens, said diffraction lens being disposed coaxially intermediate said lens gap of the objective lens and said projection lens, said diffraction lens being further disposed within said bore of said objective lens in magnetically insulating relation thereto, said diffraction lens comprising two component lenses of respective image widths coaxially adjacent to each other for developing respective flux linkages directed along said axis in mutually opposed relation, each of said component lenses having a lens gap bisected by a midplane perpendicular to said axis, the axial distance between said midplanes being less than the image width of the component lens closest to the specimen locality.

2. In a particle beam device according to claim 1, said flux linkages having respective values the ratio of which is adequate to substantially compensate image rotations due to the diffraction lens.

3. In a particle beam device according to claim 1, said objective lens and said projection lens each being electromagnetic.

4. A particle beam device according to claim 1, wherein said two lenses of said diffraction lens are two coils for developing said respective flux linkages and said diffraction lens further comprises an iron circuit for conducting said flux linkages, said iron circuit comprising three annular discs disposed in respective planes perpendicular to said axis, said two coils being sequentially disposed intermediate said discs, and a tubular portion disposed in surrounding relation to said coils and being connected to the respective edge surfaces of said discs.

5. In a particle beam device according to claim 4, said iron circuit consisting of material having low remanence.

6. In a particle beam device according to claim 1, said objective lens being a pole shoe lens having two pole shoe members disposed coaxially in relation to said axis and separated from each other so as to define said lens gap, one of said pole shoe members being disposed beyond the specimen locality and having an opening which widens in a direction extending away from said lens gap so as to form a receptacle for accommodating said diffraction lens.

7. A particle beam device according to claim 6 wherein the particle beam device is provided with a stigmator, said opening being adequate to receive said stigmator, said stigmator being in coaxial relation to said axis and being closer to said lens gap defined by said pole shoe members than said diffraction lens.

8. A particle beam device according to claim 1, wherein said apparatus has an imaging scale for transmitting the diffraction image such that the image of the specimen projected by the objective lens and the image of its diffraction diagram projected by said apparatus are formed with at least substantially the same magnification.

9. In a particle beam device according to claim 8, said imaging scale being at least 1:1.

10. In a particle beam device according to claim 8, said imaging scale being greater than 1:1.

11. A particle beam device according to claim 1, wherein said apparatus comprises a selector diaphragm disposed in the object plane of said projection lens.

12. A particle beam device according to claim 1, wherein said apparatus comprises two intermediate lenses, one of said lenses being closer to said beam generating means than the other of said lenses, said projection lens being said one lens of said two intermediate lenses, said two intermediate lenses having respective variable excitations for the entire range of magnification corresponding to a fixed objective lens excitation.

13. In a particle beam device according to claim 12, each of said intermediate lenses having two component lenses for developing respective flux linkages directed along said axis in mutually opposed relation, said flux linkages having respective values the ratio of which is adequate to substantially compensate image rotations.

14. A particle beam device according to claim 1, wherein said apparatus comprises projection means beyond said projection lens, the last lens of said projection means being a projective lens with an interchangeable pole shoe system.

15. A particle beam device according to claim 1, wherein said apparatus comprises vacuum seal means and a base plate, said diffraction lens being mounted on said base plate and extending into said bore of said objective lens, said objective lens having an end face beyond the specimen, said end face abutting said base plate, said seal means being disposed intermediate said base plate and said end face for forming a vacuumtight seal therebetween, said base plate having vacuumtight channels for directing electrical leads to said diffraction lens.

16. In a particle beam device according to claim 15, said apparatus comprising adjusting drive means mounted on said base plate for transverse displacement.

17. A particle beam device according to claim 1, wherein said apparatus comprises a selector diaphragm, disc means disposed adjacent said base plate for shielding stray magnetic fields, said disc means having means for receiving said selector diaphragm, and drive means mounted to said disc means for adjusting said diaphragm, said disc means abutting said projection lens, and a vacuum seal disposed intermediate said disc means and said projection means.

18. In a particle beam device according to claim 15, said diffraction lens being disposed in said bore of said objective lens so as to define gap between said diffraction lens and the latter whereby said gap magnetically insulates said objective lens from said diffraction lens.

19. In a particle beam device according to claim 1, said diffraction lens being adjustable to form an image of the specimen in the object plane of said projection lens with said objective lens being deenergized.

20. In a particle beam device according to claim 19, said objective lens having two excitation coils, said coils being disposed in coaxial relation to said axis and positioned there along to form a space wherein the specimen is laterally insertable.

21. A particle beam device according to claim 19, wherein one of said coils is closer to said beam generating means than the other of said coils, said one coil having a greater number of ampere turns than the other of said coils.

22. In a particle beam device according to claim 21, said objective lens having two pole shoes coaxial with said axis, one of said pole shoes being further from said beam generating means than the other of said pole shoes, said one pole shoe having a bore for receiving said diffraction lens.

23. In a particle beam device according to claim 1, said diffraction lens being adjacent said projection lens and adjustable for transmitting the diffraction diagram into said object plane of the projection lens.

24. In a particle beam device according to claim 1, wherein said diffraction lens has two focal planes, one of said focal planes being further from the specimen locality than the other of said focal planes, and aperture diaphragm is disposed so as to be coincident with said one focal plane, said diaphragm having an aperture dimensioned so that the beam may pass unimpeded when said objective lens is deenergized.